United States Patent

[11] 3,544,779

[72] Inventor Cecil W. Farrow
Monmouth Hills, New Jersey

[21] Appl. No. 665,755
[22] Filed Sept. 6, 1967
[45] Patented Dec. 1, 1970
[73] Assignee Bell Telephone Laboratories, Incorporated
Murray Hill, Berkeley Heights, New Jersey
a corporation of New York

[54] SELF-ADJUSTING RADIX CONVERTER
7 Claims, 9 Drawing Figs.

[52] U.S. Cl. .......... 235/155, 340/347
[51] Int. Cl. .......... H03h 13/175
[50] Field of Search .......... 340/169, 347; 178/15

[56] References Cited

UNITED STATES PATENTS 3,100,298 8/1963 Fluhr .......... 340/347
2,541,039 2/1951 Cole .......... 340/347

*Primary Examiner*—Maynard R. Wilbur
*Assistant Examiner*—Charles D. Miller
*Attorneys*—R. J. Guenther and Kenneth B. Hamlin

ABSTRACT: In a multilevel slicer extra slices are taken intermediate the prescribed slicing levels at the nominal signal levels. If the actual signal differs from the nominal signal on a long term average the prescribed slicing levels are adjusted to be centered between the actual signal levels. This tends to reduce errors due to nonlinear amplitude distortion in received multilevel data signals.

INVENTOR
C. W. FARROW
BY J. P. Kearns
ATTORNEY

SELF-ADJUSTING RADIX CONVERTER

FIELD OF THE INVENTION

This invention relates to a self-adjusting radix converter and, particularly, to a multilevel slicing circuit which compensates for amplitude distortion in a received multilevel data signal.

BACKGROUND OF THE INVENTION

A great deal of effort is presently being expended to develop and optimize data transmission systems so that a maximum of information may be transmitted over bandwidth-limited telephone circuits. In some such systems, binary data is applied after suitable modulation to a telephone circuit in a manner analogous to ordinary telegraph transmission systems. It has been found, however, that more information can be transmitted over these bandwidth-limited circuits by transmitting multilevel, as opposed to binary, signals. Several systems have been developed, for instance, in which 4, 8, or 16 level signals are employed. The ordinarily available binary input signals are converted before transmission by a transmitting radix converter or digital-to-analog converter to a multilevel signal format. At the receiver, a receiving radix or analog-to-digital converter is employed to regenerate the commonly accepted binary signals.

For best system accuracy, it is desirable that the transmitted signal levels of the multilevel signal be equally spaced and symmetric about zero; the signal be undistorted by transmission; and the radix converter at the receiver be set so that each slice is taken halfway between the received signal levels. Real telephone circuits, however, do distort the signal during transmission. Therefore, various equalizing circuits have been developed to remove the distortion introduced by these distorting telephone circuits. It has been discovered that by measuring the received signal levels and adjusting the slicing levels of the receiving radix converter accordingly, errors due to amplitude distortion and d.c. offset introduced by the transmitting radix converter and the telephone circuit can be substantially eliminated.

If the distortion and d.c. offset are known and constant, it is possible to preset the slicing levels of the receiving radix converter. When direct distance dialing circuits are utilized, however, a receiving radix converter is required which will initially adjust to the characteristics of each telephone circuit connected thereto in a time short compared with the duration of an average received message. The receiving radix converter is further required to adaptively adjust slicing levels during transmission in response to changing transmission circuit characteristic.

BRIEF DESCRIPTION OF THE INVENTION

To fulfill these requirements, the present invention provides a radix converter in which a first circuit is employed to provide a first output signal when an input signal exceeds a first slicing level determined by a first controlled reference signal. Second and third circuits are employed to provide second and third output signals when the input signal exceeds second and third slicing levels, respectively, determined by second and third controlled reference signals, respectively.

The second controlled reference signal is generated by a first integrator selectively responsive to the first and second output signals. The third control reference signal is generated by a second integrator selectively responsive to the first and third output signals. The third control reference signal is generated by a second integrator selectively responsive to the first and third output signals. The first controlled reference signal is generated by averaging the second and third controlled reference signals.

In one embodiment, the first output signal is provided with a first polarity at a predetermined amplitude while the second and third output signals are provided with a second polarity at substantially the predetermined amplitude. A pair of resistor-diode networks connected between the outputs of the first, second and third circuits and the inputs of the first and second integrators serve to render the integrators selectively responsive to the output signals.

DETAILED DESCRIPTION

Figure 1:
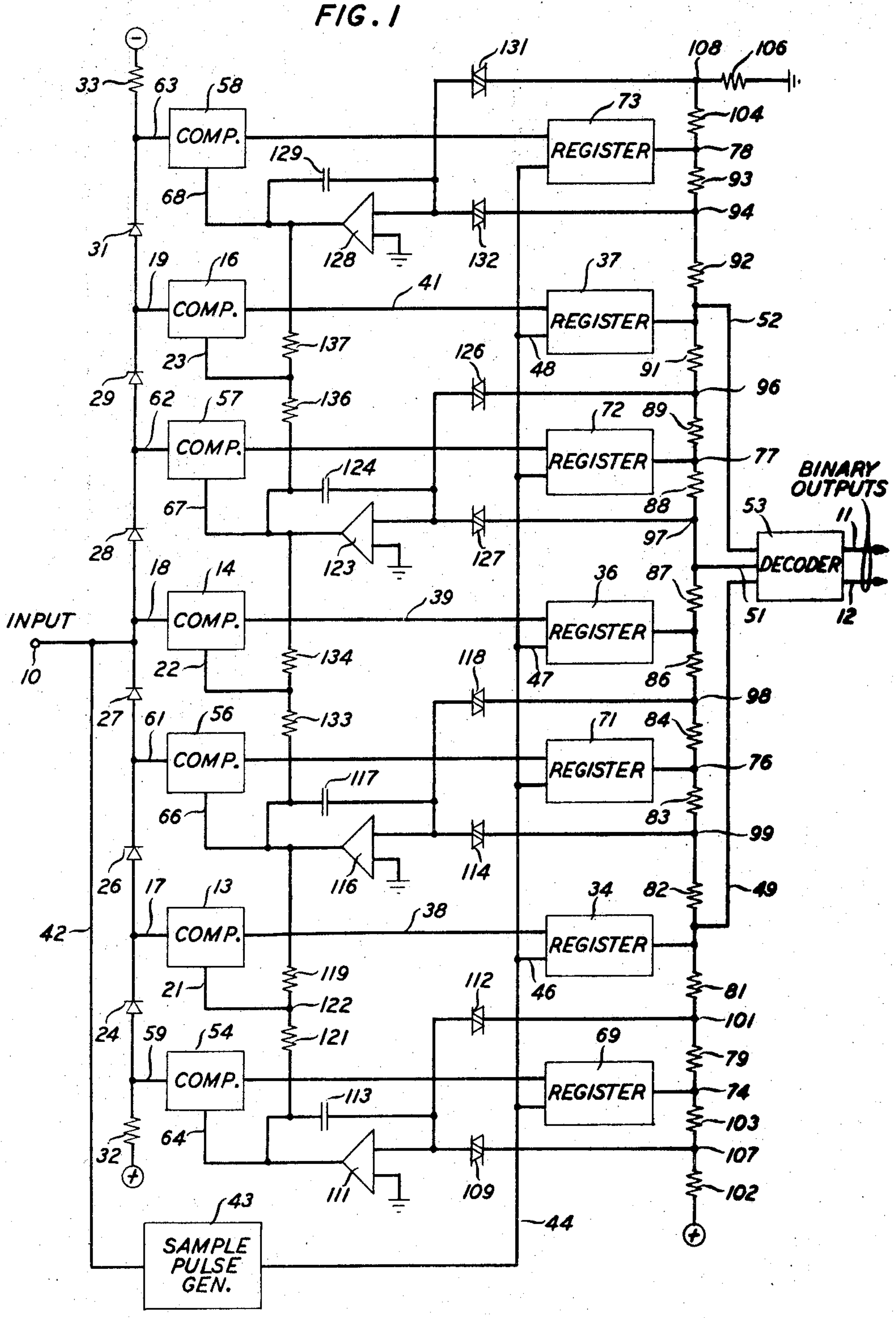
FIG. 1 depicts in schematic block diagram form a self-adjusting radix converter constructed in accordance with the principles of this invention; and FIGS. *2a—h* depict waveforms which may be observed at various points in the radix converter shown in FIG. 1.

Referring now to FIG. 1, there is shown a radix converter for accepting an analog coded data signal having four significant signal levels designated 1, 2, 3, and 4 in FIG. *2a* at an input terminal 10 and providing a two-bit binary output signal on leads 11 and 12. The analog coded data signal has been received and demodulated by equipment, not shown, which includes a conventional automatic gain control circuit to insure that the average value of the analog coded data signal applied to the terminal 10 is within a predetermined range.

To convert the analog coded data signal to binary form, three slicing levels designated $S_1$, $S_2$, $S_3$, in FIG. *2a* are established by voltage comparators 13, 14, and 16, respectively. The slicing levels are nominally established midway between the signal levels 1, 2, 3, and 4. The voltage comparators 13, 14, and 16, typically differential amplifiers or voltage controlled Schmitt trigger circuits, provide an output signal when a signal on an input terminal 17, 18, or 19, respectively, exceeds a signal applied to a reference terminal 21, 22, or 23, respectively. The three slicing levels may be established by applying different voltage levels to the reference terminal 21, 22, or 23, In this embodiment, however, the levels applied to the reference terminals 21, 22, and 23 are all substantially ground level. The slicing levels are established by d.c. shifting the analog coded data signal with a string of diodes 24, 26, 27, 28, 29, and 31, biased to their low impedance forward conduction region by current supplied from a voltage source (indicated by its positive and negative terminals shown) through resistors 32 and 33. Therefore, an output signal will be provided by the comparator 13 if the signal on terminal 10 exceeds a value below ground equal to the voltage across the two diodes 24 and 26, thereby establishing the slicing level designated $S_1$ in FIG. *2a*. In a like manner, comparator 14 establishes slicing level $S_2$ in FIG. *2a* at ground and comparator 16 establishes slicing level $S_3$ in FIG. *2a* at a value above ground equal to the voltage across the two diodes 28 and 29. The comparator 13 then may provide a signal while the comparators 14 and 16 do not. If, however, the comparator 14 provides a signal, the comparator 13 does also. If the comparator 16 provides a signal, both of the other comparators 13 and 14 also provide signals. The only signal of significance is that from the highest value comparator. The other signals providing no information are redundant.

The output signals from the comparators 13, 14, and 16 are applied to single stage registers 34, 36, and 37 by leads 38, 39, and 41. A lead 42 applies the signal appearing on terminal 10 to a sample pulse generator 43. The sample pulse generator 43 supplies a narrow pulse approximately centered between transitions of the received signal (see FIG. *2b*). Each sample pulse is applied by lead 44 to sample inputs 46, 47, and 48, respectively, on the single stage registers 34, 36, and 37, respectively, to provide a signal at terminals 49, 51, and 52, respectively. Such latter signal is positive if a signal appears at the output of the comparators 13, 14, or 16, respectively, at the time of the sample pulse provided by the sample pulse generator 43. If no signal appears at the output of a particular comparator 13, 14, or 16 when the sampling pulse is applied, the respective register 34, 36, or 37 will go to ground. The redundantly coded information appearing on terminals 49, 51, and 52 may be converted to a more convenient form, such as binary code, by a well-known decoding circuit such as decoder 53.

In accordance with the teaching of this invention, four comparators 54, 56, 57, and 58, similar to comparators 13, 14, and 16, are driven at signal terminals 59, 61, 62, and 63 by d.c. shifted replicas of the analog coded data signal on the terminal 10. The comparators 54, 56, 57, and 58 each provide an output signal when the signals applied to the signal terminals 59, 61, 62, and 63 by the diode chain exceed a signal applied to reference input terminals 64, 66, 67, and 68, respectively. The d.c. shifts imparted by the diode string are such that each of the comparators 54, 56, 57, or 58 provides an output signal when the analog coded data signal on the terminal 10 exceeds one of the four nominal signal levels. Single stage registers 69, 71, 72, and 73 each provide a negative signal on a terminal 74, 76, 77, or 78, respectively, in response to the simultaneous occurence of an output signal from one of the comparators 54, 56, 57, or 58 and the sampling pulse on lead 44. As opposed to the registers 34, 36, and 37, if a signal is provided to the register 69, 71, 72, or 73 concurrently with the sampling pulse, a ground level signal is provided at terminals 74, 76, 77, or 78.

The positive signal supplying terminals 49, 51, and 52 are interconnected with the negative signal supplying terminals 74, 76, 77, and 78 by resistors 79, 81—84, 86—89, or 91—93 to provide received signal level error signals on terminals 94, 96—99, and 101. The negative signal supplying terminals 74 and 78 are connected to a positive supply voltage and ground, respectively, by resistors 102—103, and 104—106, respectively, to provide further received signal level error signals at terminals 107 and 108.

Figure 2:
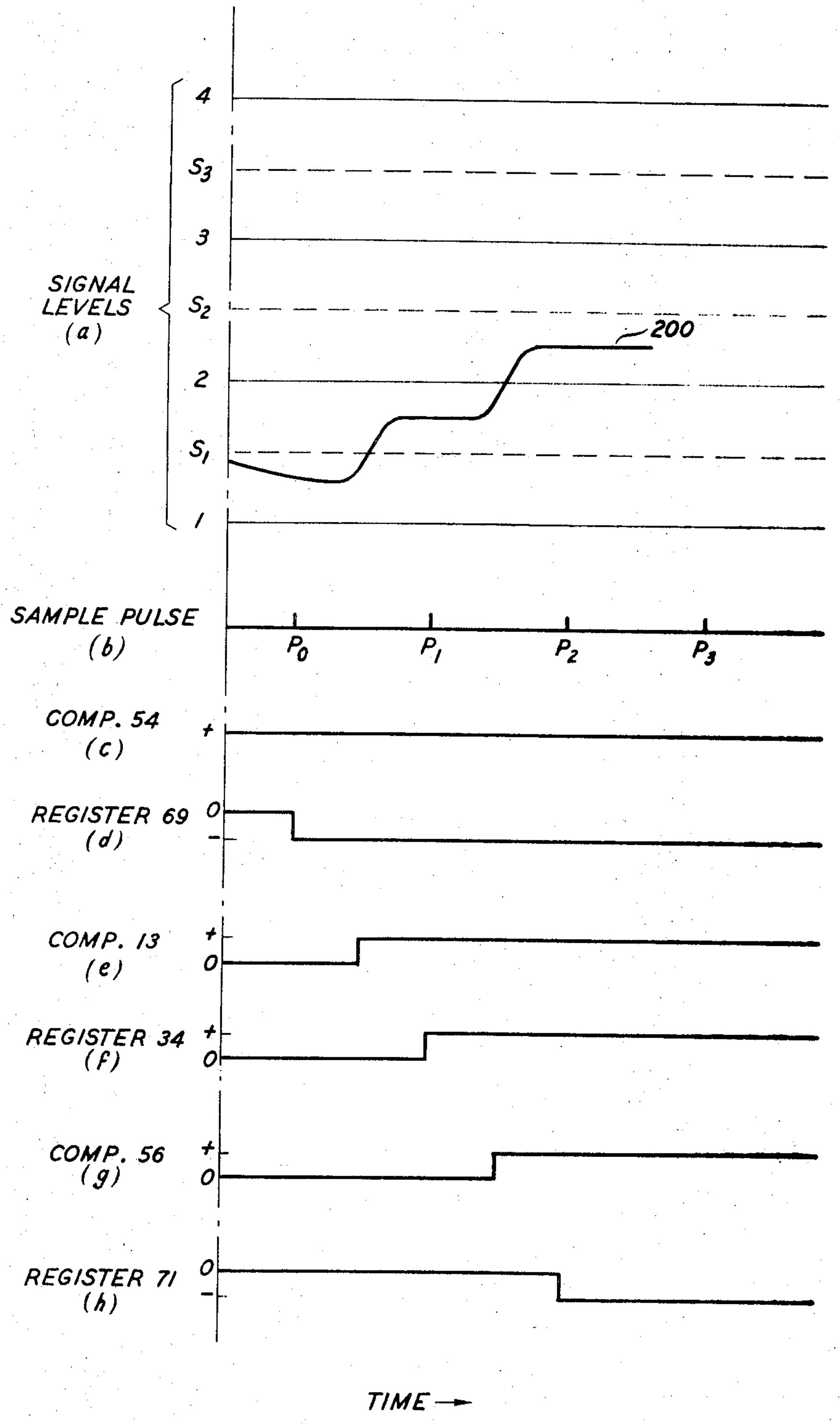

Referring now to both the figures, there is seen (see FIG. 2*a*) the received analog coded data signal 200 plotted as a function of time overlaying the nominal signal levels designated 1, 2, 3, and 4, shown in solid lines, and the nominal slicing levels designated $S_1$, $S_2$, and $S_3$, shown as broken lines. Initially, the received signal falls between the first nominal signal level 1 and the first nominal slicing level $S_1$, representing a signal of 1, being somewhat higher, however, than the nominal signal level 1. This signal applied to the terminal 10 is sufficient to induce an output signal from the comparator 54 while being insufficient to provide an output signal from the remaining comparators. The output from comparator 54 (see FIG. 2*c*), being present simultaneously with sample pulse $P_0$ (see FIG. 2*b*), will provide a negative output from the register 69 on terminal 74 (see FIG. 2*d*). The negative signal on the terminal 74, together with the positive voltage applied to the resistors 102 and 103, provides a ground level received signal level error signal on the terminal 107. A diode pair 109, serving as a nonlinear resistance, prevents current from flowing to a high gain inverted operational amplifier 111 even if there is a small voltage across the diode pair 109 due to unbalance of the positive and negative voltages supplied to the resistors 102 and 103. The negative signal on the terminal 74, in cooperation with the ground level signal on the terminal 49 provided by register 34 (see FIG. 2*f*) and registers 69 and 71 provide a negative error signal on terminal 101 sufficient to induce current to flow through diode pair 112, which is inverted and integrated on capacitor 113 connected across amplifier 111, tending to increase the voltage at the output of amplifier 111. The output of amplifier 111 connected to the reference input terminal 64 of comparator 54 brings the switching level of comparator 54 closer to the actual level of the received signal.

If the signal at the time $P_0$ had been a 1 but less than the nominal signal level, no comparator would have provided a signal to a register. Therefore, all the registers, including register 69, would provide ground outputs. It is quite clear that ground level signals would be provided on all the error signal terminals other than the terminal 107. The ground signal on terminal 74 applied to the resistor 103, taken together with the positive voltage applied to the resistor 102, provides a positive signal on the error signal terminal 107. Resulting current flowing through diode pair 109 decreases the signal on the terminal 64, thus lowering the triggering level of the comparator 54. Therefore, it is seen that when a 1 level signal is decoded by the radix converter, the additional comparator 54 provides information indicating whether the actual received signal is above or below a nominal signal level. The combination of outputs from the registers 34 and 69 provide error signals which are integrated and fed back to control the slicing level of the comparator 54. Over the long term the comparator 54 will be adjusted so that its slicing level becomes equal to the average level of the received signal for 1's.

Looking again to FIG. 2*a*, when the received signal 200 crosses the first slicing level $S_1$, the comparator 13 (see FIG. 2*e*) switches from ground to positive. Upon occurence of the sampling pulse $P_1$ (note that the received signal is above the slicing level $S_1$, therefore representing a 2 signal but below the nominal signal level), the register 34 is set to provide a positive signal on terminal 49. Since the comparator 54 is still providing a positive output signal, the register 69 provides a negative signal on the output terminal 74. With the negative signal on the terminal 74 and the positive signal supplied from the voltage source, the error terminal 107 has a ground level signal. In a like manner, with a positive signal on the terminal 49 and a negative signal on the terminal 74, the terminal 101 also provides a ground level signal. Therefore, since the received signal is a 2 rather than a 1 as determined by the fact that it exceeds the slicing level $S_1$, the 1 comparator 54 is not altered by the receipt of a signal having a level other than 1. The positive signal on the terminal 49, taken together with the ground level signal on the terminal 76, provides a positive signal on the error terminal 99. This signal induces a current in diode pair 114 which is inverted and integrated by the combination of the amplifier 116 and capacitor 117 to reduce the switching level of comparator 56 to bring the switching level thereof closer to the actual level of the received signal.

At time $P_2$ (see FIG. 2*a*), the received signal is a 2 signal but now exceeds the nominal signal level 2. In this case, it is seen (see FIGS. 2*g* and 2*h*) that comparator 56 now provides an output signal to provide a ground level signal at the output level 76 of the register 71 in addition to the positive output on terminal 49 and the negative output on terminal 74. It should be noted the same decoded signal is provided to the decoder 53 in response to the input signal present at the time of sampling pulse $P_1$ and $P_2$, the only difference now being that the signal at $P_2$ exceeds the nominal signal level while the signal at the time $P_1$ was below the nominal signal level. As seen before, when adjacent registers both have ground signals, a ground signal appears at the intermediate error terminal, as it does when adjacent registers supply alternate positive and negative signals. A nonground error signal is only supplied when one of a pair of adjacent registers is at ground while the other is either positive or negative. From the arrangement of comparators and registers, as already described, it is seen that only one pair of adjacent registers can provide an error signal on an error terminal. In this case, the negative signal from the comparator 71 on the terminal 76, taken together with the ground signal provided on the terminal 51, provides a negative error signal on the terminal 98 which provides a current through diode pair 118 which is integrated on capacitor 117 to increase the signal on reference input terminal 66 of comparator 56, and the switching level of comparator 56 is thereby raised to bring the switching level thereof closer to the actual level of the received signal.

A pair of resistors 119 and 121 are tied between the outputs of amplifiers 111 and 116 to provide a reference signal at their midpoint 122 to the reference input terminal 21 of comparator 13. By choosing resistors 119 and 121 equal, the comparator 13 will always set the slicing level $S_1$ midway between the received signal levels indicated by the comparators 54 and 56 as adjusted by the feedback arrangement described.

An amplifier 123 shunted by a capacitor 124 driven from error terminals 96 and 97 through diodes 126 and 127 drives the reference input terminal 67 of comparator 57 to adjust the nominal signal level 3 to be equal to the actual received signal level. In a like manner, an amplifier 128 shunted by a capacitor 129 is driven through diodes 131 and 132 from error terminals 94 and 108 to adjust a fourth signal level by controlling the voltage of the reference signal terminal 68. Resistor pairs 133—134 and 136—137 are connected between the reference terminals 66—67 and 67—68, respectively, to set the signals on the reference signal terminals 22 and 23, respectively, thereby placing the slicing levels $S_2$ and $S_3$ mid way between the actual received signal slicing levels. The equipment as described above operates upon a received analog coded data signal and independently adjusts the slicing levels determined by comparators 13, 14, and 16 to be midway between the actual received signal levels, notwithstanding nonlinear amplitude distortion.

It should be understood that the above-described arrangement is simply illustrative of the application of the principles of this invention. Numerous other arrangements employing the principles of this invention will be readily apparent to those skilled in the art.

I claim:

1. In combination:
- a first circuit responsive to an input signal exceeding a first value controlled by a first reference signal for providing a first output signal;
- a second circuit responsive to said input signal exceeding a second value controlled by a second reference signal for providing a second output signal;
- a third circuit responsive to said input signal exceeding a third value controlled by a third reference signal for providing a third output signal;
- a first integrator selectively responsive to said second and third output signals for providing said third reference signal;
- a second integrator selectively responsive to said first and second output signal for providing said first reference signal; and
- means proportionately responsive to said first and third reference signals for providing said second reference control signal.

2. In combination:
- a first circuit responsive to an input signal exceeding a first value controlled by a first reference signal at a first reference signal terminal for providing an output signal of a first polarity at a first terminal;
- a second circuit responsive to said input signal exceeding a second value controlled by a second reference signal at a second reference signal terminal for providing an output signal of a second polarity at a second terminal;
- a third circuit responsive to said input signal exceeding a third value controlled by a third reference signal at a second reference signal terminal for providing an output signal of said first polarity at a third terminal;
- first and second resistors connected in series between said first and second terminals to provide a first error signal at a first error signal terminal;
- third and fourth resistors connected in series between said second and third terminals to provide a second error signal at a second error signal terminal;
- means for connecting said first error signal terminal to said first reference signal terminal;
- means for connecting said second error signal terminal to said third reference signal terminal;
- a fifth resistor connected between said first and second reference signal terminals; and
- a sixth resistor connected between said second and third reference signal terminals.

3. In combination:
- a first circuit responsive to an input signal exceeding a first value controlled by a first reference signal at a first reference signal terminal for providing an output signal of a first polarity at a first terminal;
- a second circuit responsive to said input signal exceeding a second value controlled by a second reference signal at a second reference signal terminal for providing an output signal of a second polarity at a second terminal;
- a third circuit responsive to said input signal exceeding a third value controlled by a third reference signal at a second reference signal terminal for providing an output signal of said first polarity at a third terminal;
- first and second resistors connected in series between said first and second terminals to provide a first error signal at a first error signal terminal;
- third and fourth resistors connected in series between said second and third terminals to provide a second error signal at a second error signal terminal;
- means for connecting said first error signal terminal to said first reference signal terminal;
- means for connecting said second error signal terminal to said third reference signal terminal;
- a fifth resistor connected between said first and second reference signal terminals;
- a sixth resistor connected between said second and third reference signal terminals; and
- said means for connecting said first error signal terminal to said first reference signal terminal includes an inverting amplifier shunted by a capacitor to provide an integrating circuit.

4. The combination as defined in claim 3 wherein a nonlinear impedance element is interposed between said inverting amplifier and said first error signal terminal being included in said means for connecting said first error signal terminal to said first reference signal terminal.

5. In combination:
- a first circuit responsive to an input signal exceeding a first value controlled by a first reference signal at a first reference signal terminal for providing an output signal of a first polarity at a first terminal;
- a second circuit responsive to said input signal exceeding a second value controlled by a second reference signal at a second reference signal terminal for providing an output signal of a second polarity at a second terminal;
- a third circuit responsive to said input signal exceeding a third value controlled by a third reference signal at a second reference signal terminal for providing an output signal of said first polarity at a third terminal;
- first and second resistors connected in series between said first and second terminals to provide a first error signal at a first error signal terminal;
- third and fourth resistors connected in series between said second and third terminals to provide a second error signal at a second error signal terminal;
- means for connecting said first error signal terminal to said first reference signal terminal;
- means for connecting said second error signal terminal to said third reference signal terminal;
- a fifth resistor connected between said first and second reference signal terminals;
- a sixth resistor connected between said second and third reference signal terminals; and
- said means for connecting said first error signal terminal to said first reference signal terminal includes a first integrator; said combination further including:
  - a source of voltage of said second polarity;
  - seventh and eighth resistors connected in series between said first terminal and said source of voltage to provide a third error signal at a third error signal terminal; and
  - means for connecting said third error signal terminal to said first integrator.

6. The combination as defined in claim 5, wherein said means for connecting said second error signal terminal to said third reference signal terminal includes a second integrator; said combination further including:
- a fourth circuit responsive to said input signal exceeding a fourth value for providing an output signal of said second polarity at a fourth terminal;
- ninth and tenth resistors connected in series between said third and fourth terminals to provide a third error signal at a third error signal terminal; and
- means for connecting said third error signal terminal to said second integrator.

7. In combination:

a first circuit responsive to an input signal exceeding a first value controlled by a first reference signal at a first reference signal terminal for providing an output signal of a first polarity at a first terminal;

a second circuit responsive to said input signal exceeding a second value controlled by a second reference signal at a second reference signal terminal for providing an output signal of a second polarity at a second terminal;

a third circuit responsive to said input signal exceeding a third value controlled by a third reference signal at a second reference signal terminal for providing an output signal of said first polarity at a third terminal;

first and second resistors connected in series between said first and second terminals to provide a first error signal at a first error signal terminal;

third and fourth resistors connected in series between said second and third terminals to provide a second error signal at a second error signal terminal;

means for connecting said first error signal terminal to said first reference signal terminal;

means for connecting said second error signal terminal to said third reference signal terminal;

a fifth resistor connected between said first and second reference signal terminals;

a sixth resistor connected between said second and third reference signal terminals; and said means for connecting said first error signal terminal to said first reference signal terminal includes an integrator; said combination further including:

a source of ground potential;

seventh and eighth resistors connected in series between said first terminal and said source of ground potential to provide a third error signal at a third error signal terminal; and means for connecting said third error signal terminal to said integrator.